United States Patent [19]

Spencer

[11] 4,090,566
[45] May 23, 1978

[54] HORSESHOE MOUNTING APPLIANCE AND METHOD

[76] Inventor: Dudley W. C. Spencer, 619 Shipley Rd., Wilmington, Del. 19809

[21] Appl. No.: 752,742

[22] Filed: Dec. 21, 1976

[51] Int. Cl.² ............................................. A01L 3/00
[52] U.S. Cl. .................................................. 168/17
[58] Field of Search .......... 168/17, 12, 3, 18, DIG. 1, 168/4; 128/DIG. 20

[56] References Cited
U.S. PATENT DOCUMENTS

| 3,494,422 | 2/1970 | Clark | 168/4 |
| 3,732,929 | 5/1973 | Glass | 168/18 |

Primary Examiner—Hugh R. Chamblee
Attorney, Agent, or Firm—Connolly and Hutz

[57] ABSTRACT

An appliance for facilitating the adhesive mounting of a horseshoe comprises a boot having an inflatable liner in the form of a tube whereby upon inflation of the tube the horseshoe is pressed against the hoof while the adhesive is curing.

21 Claims, 5 Drawing Figures

U. S. Patent  May 23, 1978  4,090,566
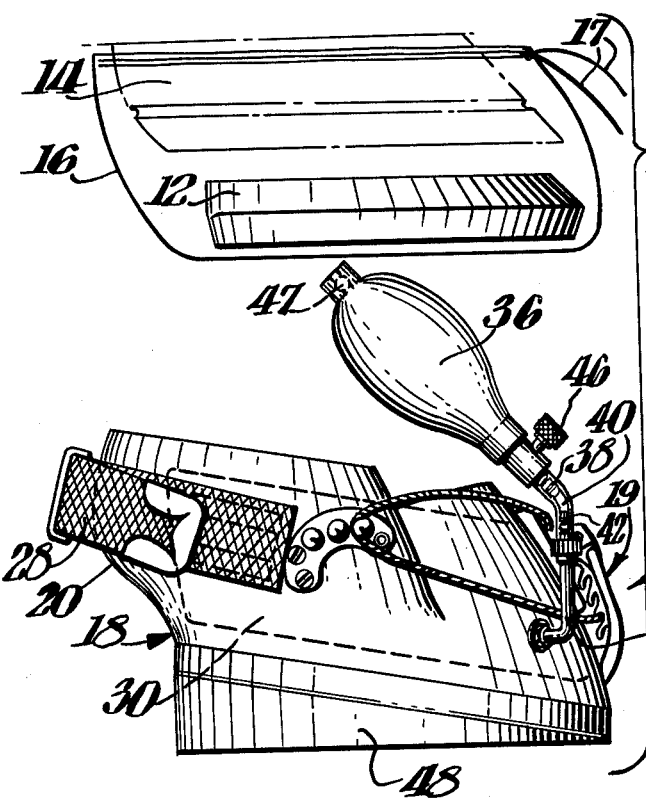
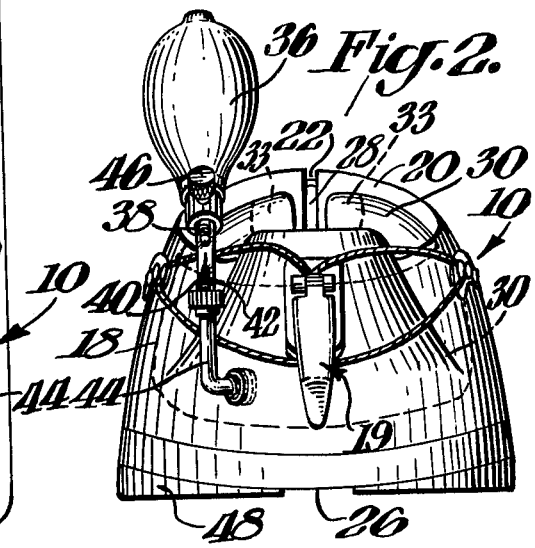
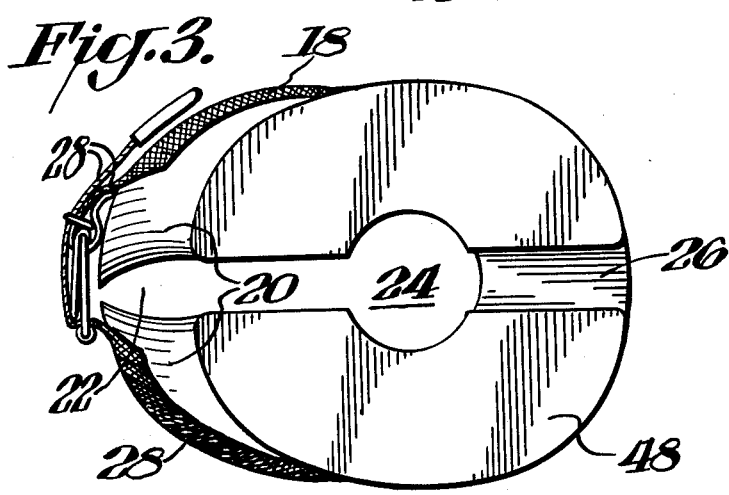
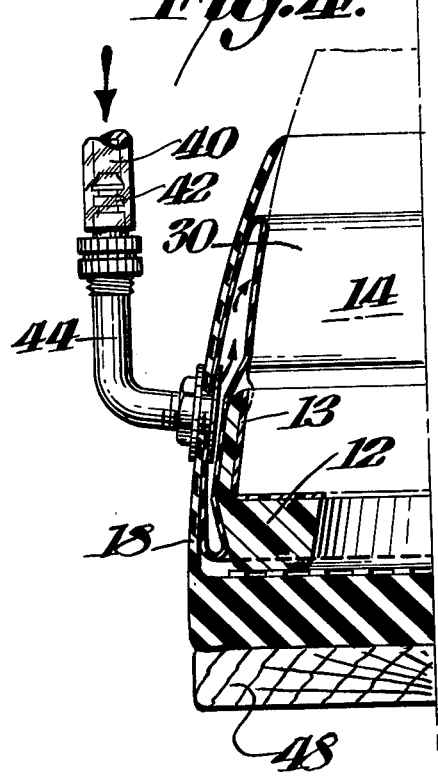
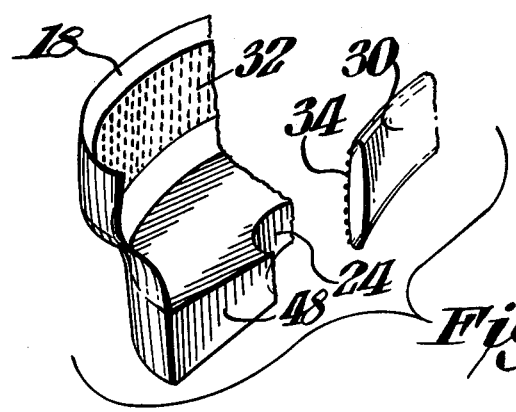

HORSESHOE MOUNTING APPLIANCE AND METHOD

BACKGROUND OF THE INVENTION

In my U.S. Pat. No. 3,664,428 I disclose a horseshoe which may be made of a plastic material, such as adiprene, and which is adhesively secured to the hoof. Various ramifications of that technique are described in my later patents and applications, namely, U.S. Pat. No. 3,782,473; U.S. Pat. No. 3,917,000; application Ser. No. 614,766 and application Ser. No. 673,371. In various of the techniques described in my earlier patents and applications it is desirable to use a quick setting adhesive. A period of time, however, is required for the adhesive to cure. For best results pressure should be applied against the shoe forcing the shoe into intimate contact with the hoof during this curing period.

SUMMARY OF THE INVENTION

An object of this invention is to provide an appliance to facilitate the adhesive mounting of a horseshoe to the hoof.

A further object of this invention is to provide such an appliance and method of application which requires minimal time and attention from the farrier.

A still further object of this invention is to provide such an appliance and method which results in minimal discomfort to the horse.

In accordance with this invention an appliance for facilitating the adhesive mounting of a horseshoe comprises a boot having an inflatable tube on its inner surface whereby upon inflation of the tube the horseshoe is pressed against the hoof while the adhesive is curing.

The boot preferably has a slit completely across its back and over a portion of its bottom to permit the boot to be distended for facilitating insertion of the hoof therein. The boot preferably is mounted on wedge type members which increase in dimension from front to back so that the tendency of the hoof is to move downwardly and forwardly thus enhancing the maintenance of pressure between the shoe and hoof.

THE DRAWINGS

FIG. 1 is an exploded view in front elevation showing the various components of the horseshoe mounting appliance in accordance with this invention;

FIG. 2 is a front elevation view of the appliance shown in FIG. 1;

FIG. 3 is a bottom plan view of the appliance shown in FIG. 2;

FIG. 4 is a cross-sectional view in elevation of a portion of the appliance shown in FIGS. 1-3; and FIG. 5 is a perspective exploded view partly in section of a portion of the appliance shown in FIGS. 1-4.

DETAILED DESCRIPTION

FIG. 1 illustrates the various components of this invention. As indicated therein, appliance 10 is for use in connection with the mounting of horseshoe 12 on the hoof 14. The appliance may also include a removable liner 16 as later described. The preferred type of horseshoe is described in my aforenoted patents and applications the details of which are incorporated herein by reference thereto. Accordingly, a further detailed description herein is not necessary except where desirable for an understanding of the present invention. In general horseshoe 12 is made of a plastic material such as adiprene which is provided with an adhesive coating 13 on its upper surface (FIG. 4) and mounted on the hoof 14. In certain practices of my prior inventions a quick setting adhesive is utilized and for best results pressure should be maintained to force the shoe into intimate contact with the hoof while the adhesive is curing. A time period of, for example, three minutes might be required for such curing. The present invention provides a manner whereby the farrier may mount the shoe on the hoof and then maintain the proper pressure through use of appliance 10. The horse is then permitted to move its foot in an unrestrained manner while wearing appliance 10 and while the farrier is mounting another shoe on a different hoof. Generally, by the time the second shoe and its appliance are mounted, curing has been completed on the first hoof and if desired the first appliance may be removed and then reused for the third hoof. Similarly, the appliance for the second hoof may later be used on the fourth hoof. Alternatively four separate appliances may be used for the four hoofs.

Appliance 10 includes a boot member 18 which may be of any suitable construction. I have, for example, formed a suitable boot member by modification of the type of boot disclosed in U.S. Pat. Nos. 3,703,209 and 3,732,929, the details of which are incorporated herein by reference thereto. In general boot 18 is made of a rigid yet somewhat flexible or resilient material having a clamping mechanism 19 at its front and sides thereof. The aforedescribed prior art boot, however, is modified in that means are provided to permit the boot to be readily distended from its normal condition to facilitate the quick insertion of the hoof with the shoe temporarily mounted thereon. To accomplish this the back 20 of the boot 18 has a slit or opening 22 extending completely therethrough and such opening 22 communicates with a further opening 24 in the bottom surface of boot 18. Although it is convenient to use the illustrated clamping machanism which is based upon the clamping mechanism of the prior patents, other types of mechanisms may also be used or if desired the front and sides may be molded closely enough to the desired shape that the need for any clamping mechanism at the front and sides is completely eliminated.

In practice after adhesive 13 has been applied to the shoe 12 and/or hoof 14 and the shoe then temporarily mounted on the inverted hoof a plastic liner such as a disposable bag 16 is tied around the hoof by manipulating draw strings 17. Liner 16 prevents any adhesive from spreading onto appliance 10. Thus liner 16 serves the dual functions of maintaining appliance 10 clean and also assures that appliance 10 will not be adhesively mounted to the hoof. If desired boot 18 may be made of a material or coated with a separant which is not compatible with adhesive 13 to prevent adhesive securement of boot 18 to hoof 14 whereby liner 16 may be omitted. Otherwise it may later be necessary to pry boot 19 off hoof 14 and/or shoe 12 should it become adhesively attached.

Hoof 14 with shoe 12 mounted thereon and bag 16 secured thereto are then inserted in boot 18 by spreading the boot at the back 20 whereupon the front end 26 acts as a hinge. Hoof 14 is still inverted. After the hoof has been inserted in boot 18 suitable fasteners 28 such as the illustrated straps are manipulated to secure boot 18 to the assembly comprising shoe 12, hoof 14 and liner or bag 16.

A key feature of this invention is that the inner surface of boot 18 is provided with means for maintaining pressure against the hoof and shoe assembly to assure initimate contact between the shoe and hoof during the curing period. Such pressure application is accomplished by the provision of an inflatable tube or liner 30 to the inner surface of the peripheral wall of boot 18. Preferably tube 30 is secured only at its remote ends thereof such as by adhesive 33 although such securement may be along the entire surface thereof. Tube 30 may be built in or be integral with boot 18. In the illustrated form, shown for example in FIG. 5, velcro formations 32, 34 on the boot 18 and tube 30 provide a convenient detachable mounting thereof. A suitable hand pump 36 is conveniently provided having a one way valve 47 at its remote inlet end thereof with a nipple 38 at the discharge end thereof. Air line or tube 40 is mounted over nipple 38 of hand pump 36 and also over nipple 42 of rigid inlet pipe 44 which communicates with the interior of inflatable tube 30 as best shown in FIG. 4. A conventional release valve 46 is also provided when deflation of tube 30 is desired. In practice hand pump 30 would be squeezed until tube is sufficiently inflated which would be known to the farrier by the greater difficulty in inflating tube 30. This inflation of tube 30 takes place after straps or fastening members 28 have been secured. As shown in FIG. 4 tube 30 is dimensioned to extend beyond the upper edge of shoe 12 thereby assuring intimate contact of shoe 12 with hoof 14.

When appliance 10 has thus been mounted on the hoof the farrier may then proceed to mounting another shoe on a further hoof. During this time period the horse is free to move the hoof having appliance 10 thereon. This lack of restraint on the horse has a quieting affect which also minimizes problems to the farrier in permitting full concentration on mounting the next shoe.

Appliance 10 advantageously includes means for further enhancing the intimate contact between shoe 12 and hoof 14 after appliance 10 has been mounted thereon and during the curing period. This is accomplished by the provision of a pair of spaced wedges 48 at the bottom of boot 18 on each side of slot 24. Wedges 48 taper upwardly and increase in dimension from front to back as best shown in FIG. 1. In this manner when the horse puts pressure on its foot the angulation or inclination of boot 18 by virtue of wedges 48 is such as to force the roof downwardly toward the bight of the shoe.

After the adhesive is cured appliance 10 is removed by deflating tube 30, unfastening straps 28, distending boot 18 and withdrawing hoof 14. Bag 16 may also be removed at this time or may be removed later when all appliances have been removed.

The application of pressure against the shoe may be accomplished by various means other than the illustrated inflatable tube 30 within the broad concepts of this invention. For example, the pressure member may be of a foam material, may be pre-formed, may be a material filled with magnetic particles or may be a tube filled with various fluids such as oil, water, gas or may be inflated by propane, aerosol or freon. The illustrated form, however, is preferable since it is not only relatively inexpensive and readily available but also provides a convenient manner of controlling the amount of inflation to assure that a clean seam will result when the shoe is permanently adhere to the hoof.

Appliance 10 thus provides a means of conveniently mounting an adhesively secured shoe on a hoof in such a way that the horse has maximal mobility, while minimizing the attention required from the farrier during the mounting process.

What is claimed is:

1. An appliance for facilitating the mounting of a horseshoe on the hoof of a horse while adhesive between the horeshoe and hoof is curing comprising a boot for fitting around and enclosing the horseshoe and the corresponding portion of the hoof, said boot having a bottom wall and an upstanding peripheral side wall for generally conforming to the size and shape and configuration of the horseshoe and hoof assembly, means for permitting said boot to be spread open to permit the horseshoe and hoof assembly to be inserted therein, an inflatable tube secured to the inner surface of said peripheral side wall over a major portion thereof, and means for inflating said tube to force said tube against the horseshoe for pressing the horseshoe against the hoof while the adhesive between the horseshoe and hoof is curing.

2. The appliance of claim 1 wherein said means for permitting said boot to be spread open includes a slit extending completely through said peripheral side wall at the back of said boot, and fastening means spanning said slit.

3. The appliance of claim 2 wherein said means for permitting said boot to be spread open further includes a slit in said bottom wall communicating with said slit in said side wall whereby the front end of said boot acts as a hinge thereof.

4. The appliance of claim 3 including wedge means on said bottom wall, said wedge means increasing in dimension from front to back of said boot whereby said boot is downwardly inclined.

5. The appliance of claim 4 wherein said wedge means includes a pair of spaced wedge members for facilitating the spreading open of said boot.

6. The appliance of claim 5 including a liner in said boot for enclosing the horseshoe and hoof assembly during the curing of the adhesive to prevent adhesive from contacting said boot.

7. The appliance of claim 6 wherein said means for inflating said tube includes a hand pump having an outlet communicating with said tube, and a release valve in said hand pump for permitting said tube to be deflated after use of said appliance.

8. The appliance of claim 1 including wedge means on said bottom wall, said wedge means increasing in dimension from front to back of said boot whereby said boot is downwardly inclined.

9. The appliance of claim 8 wherein said wedge means includes a pair of spaced wedge members for facilitating the spreading open of said boot.

10. The appliance of claim 1 wherein said tube is detachably mounted to said boot.

11. The applaince of claim 1 including a liner in said boot for enclosing the horseshoe and hoof assembly during the curing of the adhesive to prevent adhesive from contacting said boot.

12. The appliance of claim 1 wherein said tube is secured to said inner surface of said boot by being built in said boot.

13. A method of mounting a horseshoe to the hoof of a horse comprising applying adhesive material between the horseshoe and the hoof, pressing the horseshoe against the hoof to temporarily mount the horseshoe thereon, spreading open a boot, fitting the spread-open boot over the horseshoe and hoof, permitting the boot to return toward its non-spread-open condition, attaching the boot to the horseshoe and hoof, inflating an inflatable tube in the boot until the tube presses against the horseshoe to force the horseshoe against the hoof while the adhesive material is curing, and removing the boot after the adhesive material has cured.

14. The method of claim 13 wherein said boot has a slit extending completely across its bottom wall and across a portion of its bottom wall and the boot is spread open by pulling the back wall apart at the slit with the front of the boot acting as a hinge, and the boot is attached by manipulating straps across the slit on the back wall.

15. The method of claim 14 wherein the boot is inclined upwardly from front to back by wedge members on the bottom wall of the boot and forcing the horse's hoof downwardly and forwardly by the boot being so inclined when the horse puts weight on its foot.

16. The method of claim 15 including mounting a bag over the horseshoe and hoof prior to insertion into the boot for preventing adhesive material from contacting the boot.

17. The method of claim 16 wherein the tube is inflated by manipulation of a hand pump, and after the adhesive material has cured deflating the tube by manipulation of a valve in the hand pump to permit removing the boot.

18. The method of claim 17 including detachably mounting the tube to the boot.

19. The method of claim 13 wherein the boot is inclined upwardly from front to back by wedge members on the bottom wall of the boot and forcing the horse's hoof downwardly and forwardly by the boot being so inclined when the horse puts weight on its foot.

20. The method of claim 13 including mounting a bag over the horseshoe and hoof prior to insertion into the boot for preventing adhesive material from contacting the boot.

21. The method of claim 13 wherein the tube is inflated by manipulation of a hand pump, and after the adhesive material has cured deflating the tube by manipulation of a valve in the hand pump to permit removing the boot.

* * * * *